United States Patent
Wilsher (10) Patent No.: US 9,778,458 B2
(45) Date of Patent: Oct. 3, 2017

(54) SOFTWARE CONTROL OF LED ILLUMINATION OUTPUT FOR IMPROVED YIELD AND LATITUDE

(75) Inventor: Mike Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 1207 days.

(21) Appl. No.: 12/894,293

(22) Filed: Sep. 30, 2010

(65) Prior Publication Data

US 2012/0081011 A1    Apr. 5, 2012

(51) Int. Cl.
*H04N 1/40*   (2006.01)
*G02B 26/12*  (2006.01)

(52) U.S. Cl.
CPC .................. *G02B 26/127* (2013.01)

(58) Field of Classification Search
CPC ............... H04N 1/02815; H04N 1/193; H04N 1/40056; H04N 1/1013; H04N 1/0287
USPC ................ 358/445, 443, 475, 509; 399/220; 355/67–70; 250/205, 227.21, 234–236
See application file for complete search history.

(56) References Cited

U.S. PATENT DOCUMENTS

| | | | |
|---|---|---|---|
| 6,191,873 B1 * | 2/2001 | Mizoguchi ........... | H04N 1/4076 358/461 |
| 7,308,375 B2 | 12/2007 | Jensen et al. | |
| 8,054,325 B2 * | 11/2011 | Kawamoto ................... | 347/237 |
| 8,643,921 B2 * | 2/2014 | Sugiyama ..................... | 358/509 |
| 2010/0079503 A1 | 4/2010 | Ramanath et al. | |
| 2010/0182656 A1 * | 7/2010 | Tsai ............................. | 358/475 |
| 2010/0231991 A1 * | 9/2010 | Nakajima .......... | H04N 1/00835 358/475 |
| 2012/0075647 A1 * | 3/2012 | Takahashi ................ | H04N 1/48 358/1.9 |

* cited by examiner

*Primary Examiner* — Cheukfan Lee
(74) *Attorney, Agent, or Firm* — Novel IP (57) ABSTRACT

The present application discloses methods and systems for calibrating a scanning system. In one embodiment, the calibration method determines a dark level of at least one pixel, determines a maximum white level for at least one pixel and adjusts the current of an illumination source based upon an output of an analog to digital converter. In another embodiment, the scanning system has a circuit for dynamically adjusting the output of an illumination source. The circuit has a pulse width modulated signal generator for generating a pulse width modulated signal and a driver for receiving the pulse width modulated signal and causing current to the illumination source to be modulated based on the pulse width modulated signal.

8 Claims, 6 Drawing Sheets

SOFTWARE CONTROL OF LED ILLUMINATION OUTPUT FOR IMPROVED YIELD AND LATITUDE

FIELD

The presently disclosed embodiments are generally related to the field of scanning technology and, more particularly, to systems and methods for calibrating exposure based upon the illumination capabilities of the LEDs and the sensitivity of detectors used in the scanning system.

BACKGROUND

Scanning technology is used to convert paper or other documents into digital documents, helping to reduce the amount of paper created in a typical business environment and to increase the speed at which business can be conducted. A scanner comprises a plurality of photosensors, typically in the form of a linear array, that move relative to an image on a sheet of paper. As the linear array of photosensors moves across the image, each photosensor outputs a series of signals related to the intensity of reflected light from the small area of the image focused on by a given photosensor at a given moment. These output signals are then sampled and collected, in a manner known in the art, and used to generate digital image data.

The responsivity of a particular photosensor, and, by extension, an entire scanner, is defined by the relationship between the intensity of light impinging on the photosensor and the resulting value, typically in the form of a voltage, or a digital "gray-scale" value derived from the voltage, of the output signal. If the responsivity is considered in the form a graph in which increasing light intensity forms the x-axis and the output voltage forms the y-axis, the gain of the photosensor is the slope of a linear relationship, while the offset is indicated by the y-axis intercept, thus indicating the voltage output of the photosensor at zero light intensity.

In the practical, day-to-day use of a scanner, the responsivity of each of the photosensors changes over time, and the changes in the system must be compensated for periodically, in order to ensure consistent output from the scanner. Common sources of long-term performance variation over time of a scanner include the declining intensity of the internal light source in the scanner, and the general fading of test surfaces from their original preset reflectivities.

The periodic compensation of the system for changes in responsivity is known as "calibration" of the scanner. The calibration step is typically carried out at the power-up of the scanner, and generally comprises the steps of having the photosensors in the array be exposed to two test strips built into the scanner: a black test strip for setting the offset, and a white test strip of a predetermined reflectivity for setting the gain, or a single white strip for white calibration and the illumination off for black calibration. These test strips are often incorporated into the structure of the scanner. The test strips are of sufficient width so that each photosensor moving across the strips will be able to measure the reflectivity of a plurality of small, pixel-size regions in each strip. For each of the black strip (for analysis with the illumination off) and the white strip, the calibration system measures reflectivity values for a number of small pixel-size regions and averages the readings in order to "smooth out" any small variations in the reflectivity (either black or white) of a given test strip. In practical use however, calibration methods that merely compute an average of a set of pixel-size regions on a test strip fail to take into account the possible presence of large anomalies in signals from the test strips, which may occur due to accumulation of specks of dust, dirt or hair on the strips.

Besides the need for calibration, various scanner sensors including those within sensor arrays may respond to power supply voltage differently and sensor output voltage ranges may vary from sensor to sensor. Also, variations in sensors generally exist due to process variations during the manufacturing. The light sources, such as light emitting diodes (LEDs), employed in scanners often vary in their performance due to process variations as well.

There is, therefore, a need for methods and systems that can optimally control the light output of a light emitting diode (LED) in a scanner based upon sensor sensitivity and LED illumination, thereby correcting for process variations and other factors that may adversely affect exposure of the image being scanned. This allows the selection of the optimum light output for a particular sensor response to give the best range and signal to noise characteristics. There is further a need for a calibration method for setting the gain and offset of the photosensors in a scanner, which takes into account and discounts the anomalies in signals from test strips.

SUMMARY

In one embodiment, the application discloses a method for calibrating a scanning system, said method being performed by a scanning system, comprising determining a dark level of at least one pixel, determining a maximum white level for at least one pixel and adjusting a current of an illumination source based upon an output of an analog to digital converter, wherein said adjustment modifies the maximum white level to a threshold value. The dark level and white level are preferably determined for the same pixel, but may also be determined for an overlapping set of pixels, all the pixel-sized regions of a test strip, or different pixel-sized regions within the same test strip.

Optionally, the threshold value for the scanned media is within typically 5% of a maximum output of the analog to digital converter. If the output of the analog to digital converter is saturated, the current is reduced. If the output of the analog to digital converter below a threshold value, the current is increased. If the current is at a minimum level and the output of the analog to digital converter is saturated, the scanning system generates an alarm indicative of a defect in said system. The maximum white level for the at least one pixel is determined by activating the illumination source and scanning, using at least one photosensor, the at least one pixel. The illumination source is a single LED or multiple LEDs. The current is modified on a scan-by-scan basis. The current is adjusted in a range of 10 mA to 1 A, depending on the construction of the illumination source. The current is adjusted based upon a reflectance of the calibration strip. The current is adjusted based upon a maximum reflectance of media to be scanned. The method further comprises setting a gain, wherein an output of a plurality of photosensors is multiplied by the gain to modulate said output.

In another embodiment, the application discloses a circuit for dynamically adjusting an output of an illumination source in a scanning system comprising a pulse width modulated signal generator for generating a pulse width modulated signal, and a driver for receiving said pulse width modulated signal and configured to cause current to the illumination source to be modulated based on said pulse width modulated signal.

Optionally, the illumination source comprises a single LED or multiple LEDs. The current is modulated on a scan-by-scan basis. The driver modulates the current in a range of 10 mA to 1 A, depending upon the construction of the illumination source. The current is modulated based upon an output of an analog to digital converter, wherein said adjustment modifies a maximum white level to a threshold value. The threshold value for the scanned media is within typically 5% of a maximum output of the analog to digital converter. If the output of the analog to digital converter is saturated, the current is reduced. If the output of the analog to digital converter below the threshold value, the current is increased. The current is modulated using a voltage signal level.

These and other embodiments shall be further explained and described in the Detailed Description section with reference to the Drawings.

BRIEF DESCRIPTION OF THE DRAWINGS

These and other features and advantages will be appreciated as they become better understood by reference to the following Detailed Description when considered in connection with the accompanying drawings, wherein.

DETAILED DESCRIPTION

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In one embodiment, the scanner comprises a system for controlling the light output of the light source of a scanner, such as a Light Emitting Diode (LED) by controlling the current supply to the light source. In the embodiment shown, the illumination is achieved using a single or dual LED system. Accordingly, only a single current control is used. It should be appreciated, however, that more LED systems can be used and, further, that one or more controllers of multiple current sources for an LED array may be implemented. In one embodiment, the system comprises a memory storing a plurality of programmatic instructions and circuitry that control LED illumination in accordance with a calibration method, thereby improving the useful range of the photosensor chips in a scanner. This leads to a better signal to noise ratio, less bit quantization, and an improved yield from the photosensor chips, since a wider range of sensitivities can be used.

It may be noted that the word "scanner" as used herein encompasses stand-alone scanning devices, as well as scanning devices integrated with other apparatuses, such as a digital copier, digital printing systems, facsimile machine, bookmaking machine, multi-function machine, and any other device comprising a scanning function.

Figure 1:
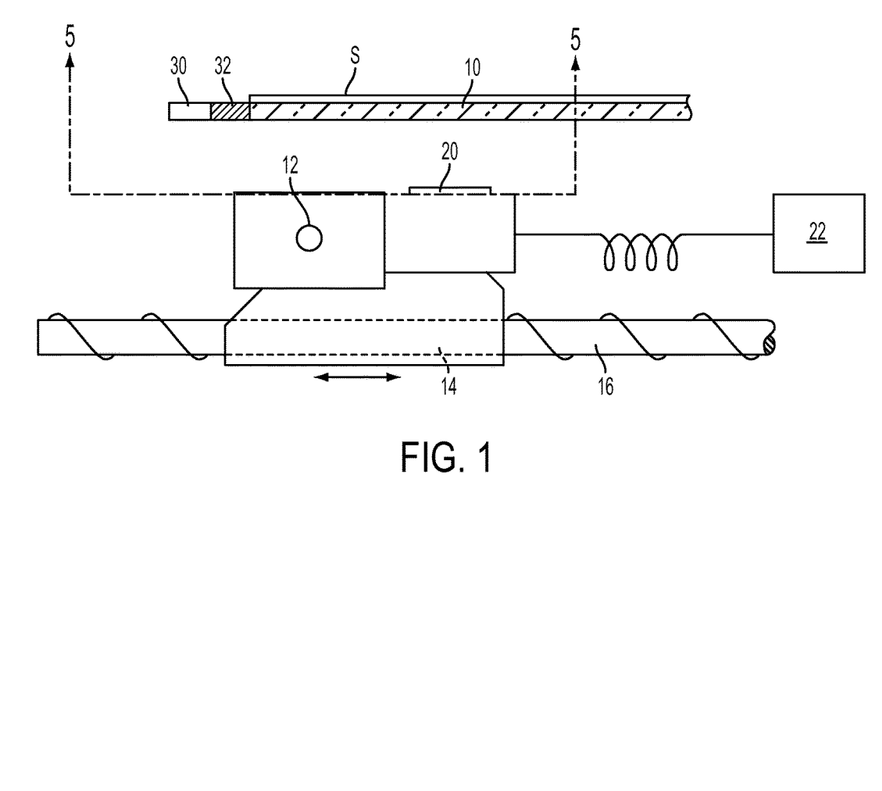
FIG. 1 illustrates the basic elements of a scanner.

Referring to FIG. 1, the basic elements of a scanner are shown. An image to be scanned from a sheet S is placed on a transparent platen 10. From the other side of the platen 10, the image is illuminated by a light source, such as single or multiple LEDs 12. The light source is conveyed by a reciprocating shuttle 14, which causes the light source 12 to be moved, or scanned, relative to the sheet S. The shuttle 14 may be moved by any number of possible means, such as the rotatable screw 16 shown, or any other arrangement known in the art. Also mounted on shuttle 14 is a full-width photosensor array 20 which moves with the light source 12, and which serves to receive the light from light source 12 which is reflected from the image on sheet S. It should be appreciated that other scanners embodiments may be used, including scanners in which the scan element is stationary and the document being scanned is transported past the scanning element.

The array 20 is operatively connected, by serial or parallel means or a combination of such means, to an image processing system here shown schematically and indicated as 22. Image processing system 22 is generally in the form of a computer, comprising at least one processor and memory, and is capable of converting the voltage outputs to a stream of digital gray-scale levels, and performing various functions on these gray-scale levels. A control program within image processing system 22 includes a plurality of programmatic instructions, stored in memory and executed by a processor, to calibrate the LEDs based upon LED illumination level and photosensor sensitivity, thereby controlling the illumination of the light source 12.

Off to one side of the platen 10, but still generally within the path of shuttle 14, is a pair of test strips, a white test strip 30 and a black test strip 32. These test strips are positioned so that, at start-up, the strips may be illuminated by light source 12 and the light reflecting there from may be detected by the photosensors in array 20. During calibration, photosensors in the array 20 are caused to move across each test strip 30, 32, such that a plurality of pixel-size regions of each strip along the path of each individual photosensor in the array are sampled. The term "pixel" shall refer to a region on an image that is formed by the output of a photosite on a sensor and a "pixel-size region" refers to an area that corresponds in size to the outputted pixel. In one embodiment, the respective test strips 30, 32 are dimensioned such that each photosensor in the array is able to sample approximately 32 pixel-size regions within each test strip. It may also be noted that in a typical full-width scanner, the resolution of the individual photosites in array 20 may vary from 200 to 1200 dots per inch (dpi), typically 600 dpi.

The purpose of the white test strip 30 is to permit adjustment of the gain of the system, while the purpose of the black test strip (or illumination off) 32 is to allow adjustment of the offset of the system. This calibration of the system is typically initiated automatically by the system either periodically or at start-up when the machine is turned on.

Figure 2:
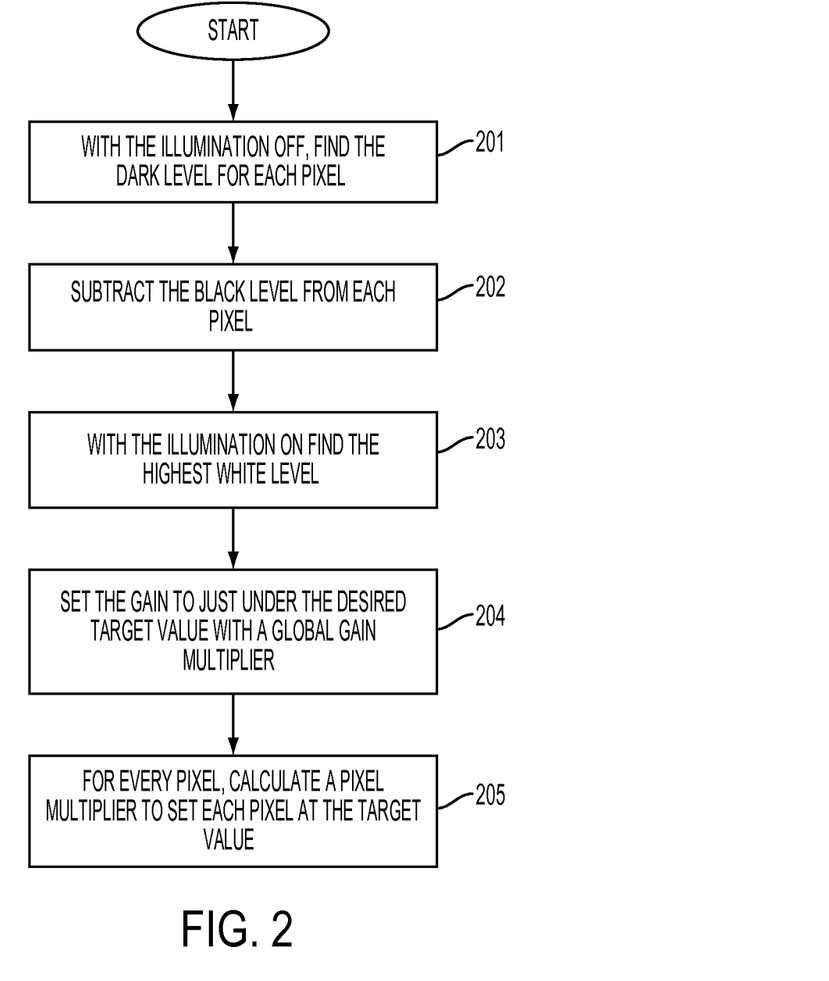
FIG. 2 is a flowchart illustrating an exemplary workflow of a calibration method, as executed by the image processing system of the scanner.

FIG. 2 illustrates, by means of a flowchart, an exemplary workflow of the calibration method, as executed by the image processing system of the scanner. The calibration method serves to calibrate the operation of the photosensors and the associated signal processing circuitry. The scanner calibration routine ensures that the analog offset and the analog gain are set such that the values obtained from the photosensors represent valid and accurate imaging information. In addition, the scanner calibration method also identifies any malfunctioning sensors within the photosensor array, as this would normally cause a failure of calibration.

Referring to FIG. 2, the calibration method identifies 201 the dark level for each pixel. Dark levels represent sensor values that are generated with no light from the light sources, and are calculated by scanning a plurality of pixel-sized regions in the white test strip with the photosensors and measuring the corresponding reflectivities. Thereafter, the black level is subtracted from each pixel 202. Black level is used for adjusting offset, which represents an average reflectivity of the black test strip. The system then turns 203 illumination on and the pixel-sized regions are again scanned with the photosensors to determine the highest white level, which is the maximum reflectivity.

Thereafter, the calibration method sets a gain to just under the desired target value with a global gain multiplier 204. Gain is the correction factor related to the average reflectivity of the white test strip with which the actual output of the photosensors is multiplied. For every pixel, a pixel multiplier is calculated 205 to set each pixel at the target value.

The calibration method described above accounts for the range of sensor sensitivities and the range of illumination output in order to determine the gain and offset. Thus, for example, if the photosensor array exhibits a 25% variation in peak output and the light source in the scanner shows a 30% range in light level, the operating range of the calibration method takes into account these factors in determining optimum gain setting.

Figure 3:
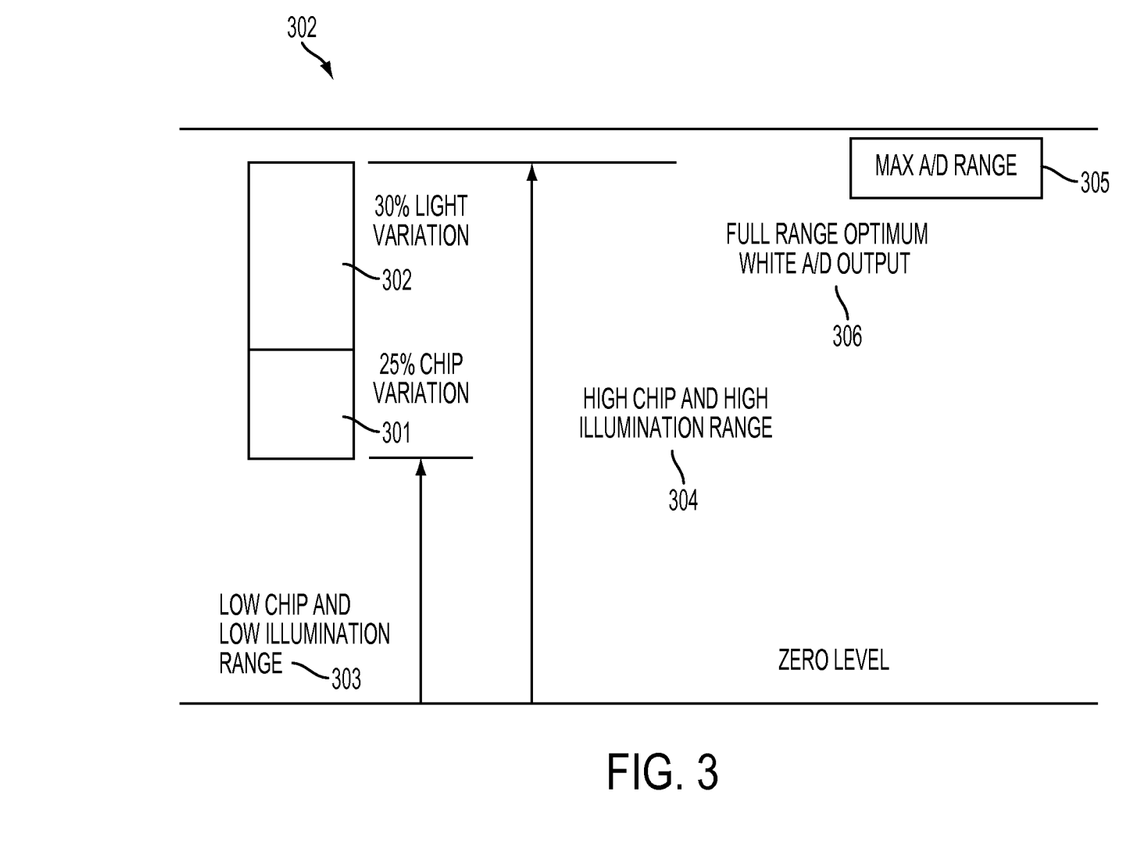
FIG. 3 illustrates the operating range of the calibration as influenced by variations in light output and sensor response.

Referring to FIG. 3, sensor variation 301, in combination with illumination variation 302, result in a wide operational range which, if not accounted for, causes the image being scanned to not be optimally distributed in the operational range, hence not making the best use of the sensor response. Since the sensor values are applied to an analog-to-digital (A/D) converter to convert the sensor values to digital form, the calibration method should further take into account the maximum input voltage range 305 of the A/D converter. While a calibration method could just set the gain of the sensor amplifier to a low value, such that with a high sensor sensitivity and a high illumination level, the resultant output analog value of the sensor is below the A/D maximum. However this also results in a low signal when sensor sensitivity is low along with a low illumination level. Thus, obtaining a full range optimum white A/D output 306 becomes a challenge.

Figure 4:
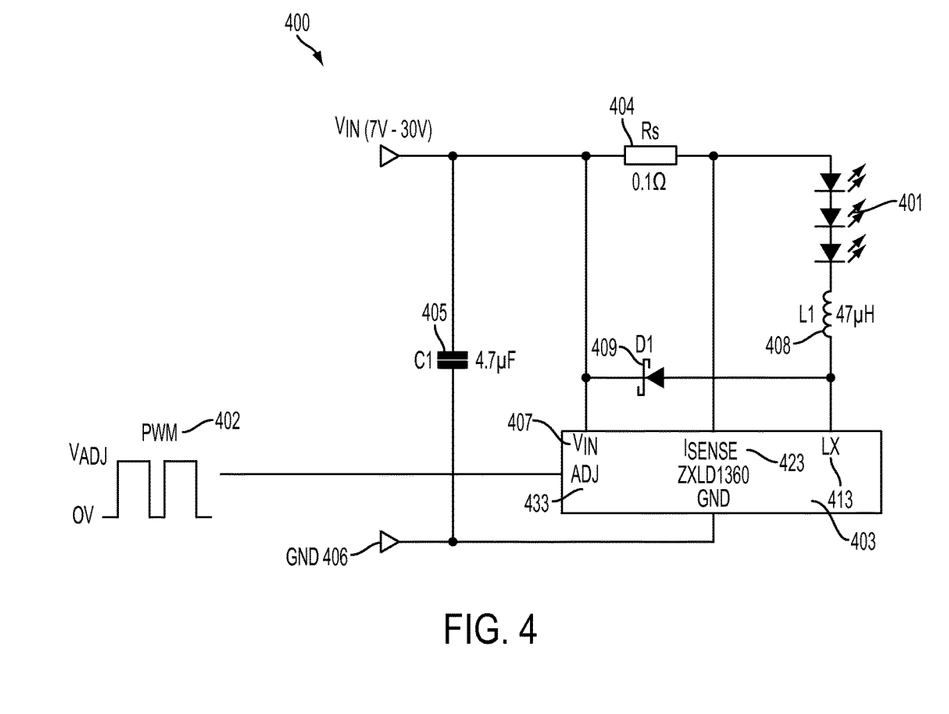
FIG. 4 illustrates an exemplary circuit that uses current control for controlling the illumination of a light source.

In one embodiment, the presently disclosed system addresses this issue by dynamically adjusting the output of the light source when a calibration method is performed by the image processing system of the scanner. Referring to FIG. 4, an exemplary circuit 400 is employed for controlling the illumination of a light source, which, in this case, is a single LED or multiple LEDs 401 connected in series. In one embodiment, illumination is adjusted by controlling the current through the LEDs. Current is controlled by means of a pulse width modulated (PWM) signal 402. One of ordinary skill in the art would appreciate that generation of the PWM signal 402 for dynamic adjustment of current, and hence the illumination of LEDs, is under control of the aforementioned processor.

The PWM signal 402 is applied to the series of LEDs 401 through a suitable LED driver 403, such as for example, but not limited to, the ZXLD 1360 by Zetex Semiconductors. One of ordinary skill in the art would appreciate that an LED driver chip of any other make may be used for the purpose, as long as it is capable of driving single or multiple LEDs efficiently from a voltage source higher than the combined LED forward voltage. The LED driver chip 403 includes the output switch LX 413 and a high-side output current sensing circuit 423, which uses an external resistor 404 to set the nominal average output current. Output current can be adjusted above, or below the set value, by applying an external control signal, (in this case the PWM signal under the control of scanner processor, however such control can also be realized by analog control depending upon the driver), to the 'ADJ' pin 433 of the LED driver. The circuit 400 also includes an optional external capacitor 405 from the ADJ pin 433 to ground 406, which along with PWM filter components in the LED driver 403 provide a soft-start feature by controlling the rise of input/output current.

Operationally, the LED driver 403 acts as a self-oscillating continuous-mode buck converter. Therefore in one state, current flows from the input $V_{IN}$ 407 to ground 406, via external current-sense resistor $R_S$ 404, coil $L_1$ 408 and the LEDs 401. The current rises at a rate determined by $V_{IN}$ 407 and $L_1$ 408 to produce a voltage ramp across $R_S$ 404. In the other state, the current in $L_1$ 408 continues to flow via diode $D_1$ 409 and the LEDs 401 back to $V_{IN}$ 407. The current decays at a rate determined by the LEDs and diode forward voltages to produce a falling voltage. As mentioned above, a PWM signal can be applied to the ADJ pin 433 to change the nominal average output current determined by the voltage across the resistor $R_S$ 404. Thus, the output current can be adjusted to a value above or below the value set by resistor $R_S$ 404.

In this manner, the LED current and thus the light output produced by the LEDs can be readily controlled over a wide range and on a scan-by-scan basis. In one embodiment, the current range may be adjusted between 10 mA to 1 A, depending upon the construction of the illumination source. Also in one aspect, control ranges for light output are in the range of 4 to 1, with adjustment resolution steps of less than 10% of the range. Accordingly, the system permits adjustment of LED light output based upon, directly or indirectly, the scan speed or the scanning application. The system is also capable of maintaining a substantially constant signal to noise ratio, even if with different scan speeds, different scanning applications, and different images being scanned.

Figure 5:
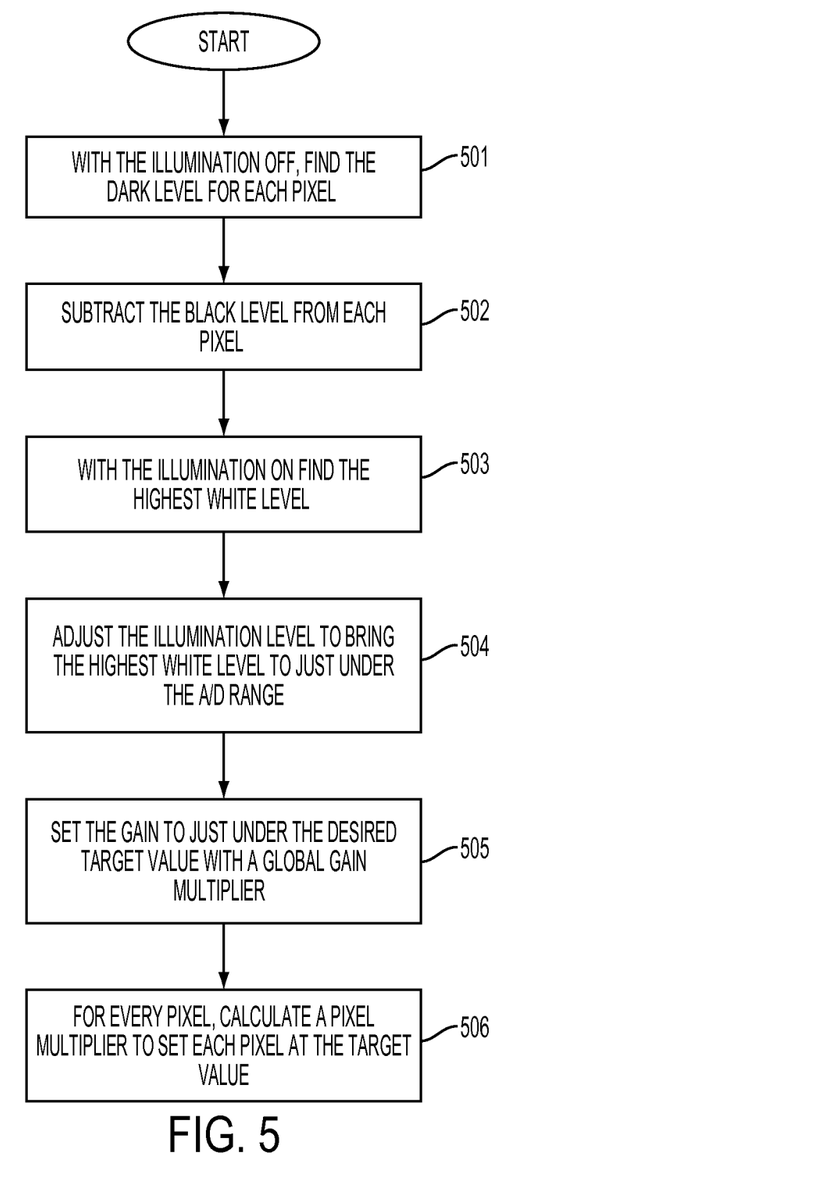
FIG. 5 is a flowchart describing a calibration method that includes dynamic adjustment of light output.

In one embodiment, the adjustment of light output as described above is incorporated in the calibration method, thereby making the calibration adapt to overexposure as well as underexposure. FIG. 5 provides a calibration method, executed by a processor operating on a plurality of programmatic instructions stored in memory, that includes the dynamic adjustment of light output, as executed by the image processing system of the scanner.

Referring to FIG. 5, the calibration method identifies 501 the dark level for each pixel, with no light from the light sources. The black level is subtracted from each pixel 502, which is used for adjusting offset. The system switches on illumination 503 and the pixel-sized areas in the white calibration strip are scanned with the photosensors to determine the highest white level. The calibration method adjusts the illumination level 504 of the light source (LEDs) by adjusting the current passing through the LEDs, so as to bring the highest white level to just under the maximum range of analog to digital (A/D) converter, taking into account the reflectance of the calibration strip and the maximum reflectance of the media likely to be encountered. In one embodiment, the LED current is modulated so that the maximum white level for the scanned media is within typically 5%, or some amount therein, of the output of the A/D converter but still less than the output of the A/D converter. The calibration method also sets a gain to just under the desired target value with a global gain multiplier 505. Gain is the correction factor with which the actual output of the photosensors is multiplied. For every pixel, a pixel multiplier is calculated 506 to set each pixel at the target value. The adjustment of LED current can be optimized by determining the current output value and the current being applied, and the desired output value is obtained by looking up LED current on an illumination curve to determine the new LED current.

By adjusting illumination, the image processing system is able to reduce the light output if the A/D converter output is saturated, such that the light output is just under the saturation value, for the maximum media reflectance, at the optimum white level. If after adjustment, the output is still saturated with the minimum light level, the system generates an alarm indicating a defect, or a fault, in the system. In such a case, it is deduced that the photosensor or light source is defective, and the appropriate parts are exchanged. On the other hand, if the A/D converter output is below the optimum white level, the image processing system increases the light output to obtain the desired level. If this level is not attainable, the maximum light output is used.

In one embodiment, the illumination level adjusted during a calibration process is used as a default setting for subsequent runs of the calibration routine.

In a system without dynamic adjustment of the light level, the range of light output and the range of sensor sensitivities have to be managed such that a minimum signal to noise ratio and a maximum signal to prevent saturation are still achievable within the sensors' linear region. Accordingly, sensor responses outside this range must be rejected, resulting in a reduced yield for manufacture. If the light source current is dynamically adjusted a larger range of sensor sensitivities can be accommodated, still achieving the minimum signal to noise ratio without saturation, hence improving the manufacturing yield and improving the robustness of the system over a wider range of conditions.

Figure 6:
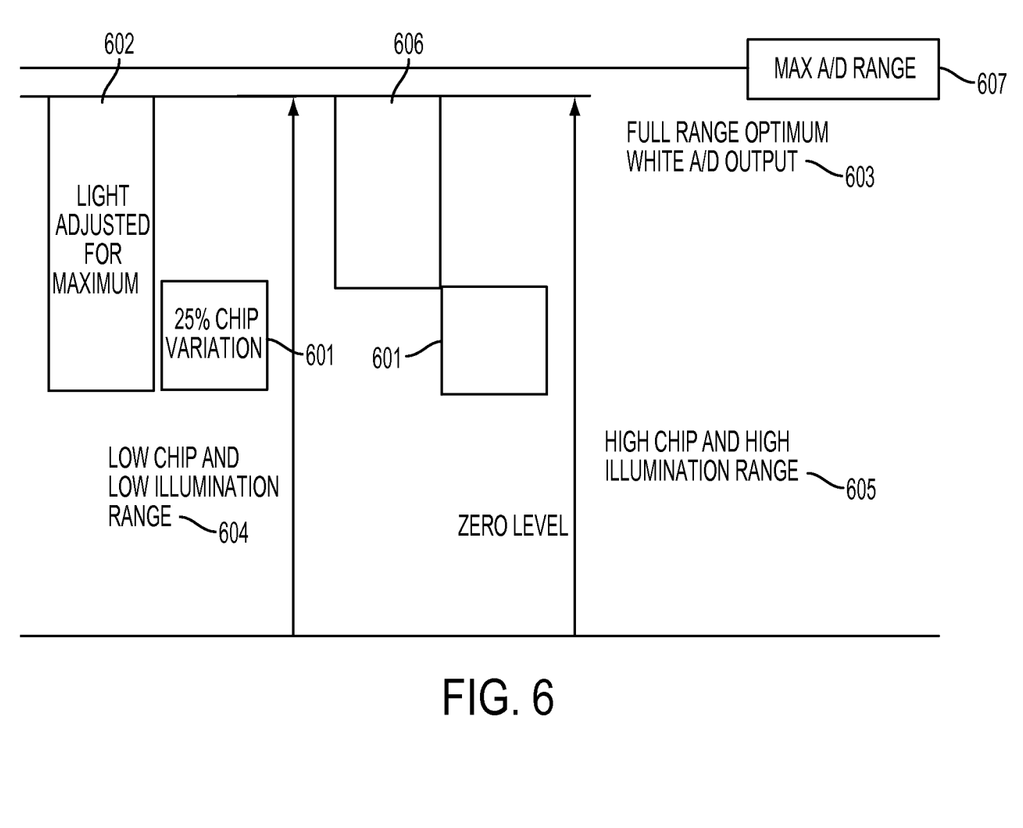
FIG. 6 illustrates an exemplary operating range for the calibration method described in FIG. 5.

FIG. 6 illustrates an exemplary operating range for the calibration method which employs dynamic light adjustment, as described above. Referring to FIG. 6, if, for example, there is a 25% variation in the sensor response 601, then it is compensated for by varying the light output by an appropriate amount, so as to achieve the full range optimum white A/D output 603. Thus, for low chip and low illumination range 604, light output 602 is adjusted to the maximum, and for high chip and high illumination range 605, light output 606 is reduced by an appropriate amount. One of ordinary skill in the art would appreciate that although a 25% variation is considered in the present example, this method allows a larger range in sensor sensitivity which can be compensated for by adjustment in light output. Further, this method provides the advantage of using more of the maximum A/D range 607. This results in less bit quantizing. Thus, even in case of the sensor output being low, which would have otherwise resulted in a lower signal to noise ratio, the present method allows for maintaining a high signal to noise ratio.

In any scanning system, one objective is to keep the light output at white calibration at the optimum level. The optimum value is dependent on the optics, A/D, sensors and the relative reflectance of the calibration strip and the brightest media to be scanned. Normally, the optimum level is set to ensure that media on the platen is not saturated. The calibration methods described herein account not only for saturation or overexposure, but also for underexposure. In other words, this calibration system dynamically adjusts for both the upper end of exposure and lower end of exposure. Adjustment of the LED current to control illumination additionally compensates for sensor responses across the different sensors in an array. This enables a wider range of sensor responses to be utilized than with a fixed illumination system.

The calibration system described above thus allows many different component types, with varying parameters, to be used with the scanning system. Scanning systems typically require a high degree of coordination of the light source, such as LED(s), with the photosensor array being employed in the system, such that the illumination produced by the light source is neither too bright nor too dim for the sensors. With the ability to dynamically adjust output of a light source across a wide range as described above, the system can up-modulate a dim LED to its highest illumination for use with less sensitive sensors, or down-modulate an LED to a lower illumination for use with more sensitive sensors. In this manner, the combined effect of LED illumination and sensor sensitivity is optimized. Therefore, photosensors having different performance characteristics and responsivity (gain relative to light input) may be employed with the present system, than conventionally used. This feature allows manufacturers of scanning systems more flexibility in the components they can use.

It will be appreciated that various above-disclosed embodiments, other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A circuit for dynamically adjusting an output of an illumination source in a scanning system, the circuit comprising:
   a pulse width modulated signal generator for generating a pulse width modulated signal; and
   a driver for receiving said pulse width modulated signal and configured to cause current to the illumination source, having a light output, to be modulated based on said pulse width modulated signal, wherein the light output of the illumination source is modulated based upon a scan speed or scanning application.

2. The circuit of claim 1 wherein the current is modulated using a voltage signal level.

3. A circuit for dynamically adjusting an output of an illumination source in a scanning system, the circuit comprising:
   a pulse width modulated signal generator for generating a pulse width modulated signal; and
   a driver for receiving said pulse width modulated signal and configured to cause current to the illumination source to be modulated based on said pulse width modulated signal, wherein the illumination source comprises a single LED or multiple LEDs.

4. A circuit for dynamically adjusting an output of an illumination source in a scanning system, the circuit comprising:
  a pulse width modulated signal generator for generating a pulse width modulated signal; and
  a driver for receiving said pulse width modulated signal and configured to cause current to the illumination source to be modulated based on said pulse width modulated signal, wherein the driver modulates the current in a range of 10 mA to 1 A.

5. A circuit for causing a dynamic adjustment of an output of an illumination source in a scanning system, the circuit comprising:
  a pulse width modulated signal generator for generating a pulse width modulated signal; and
  a driver for receiving said pulse width modulated signal and configured to cause current to the illumination source to be modulated based on said pulse width modulated signal, wherein the current is modulated based upon an output of an analog to digital converter, wherein said dynamic adjustment modifies a maximum white level to a threshold value.

6. The circuit of claim 5 wherein said threshold value is within approximately 5% of a maximum output of the analog to digital converter.

7. The circuit of claim 5 wherein, if the output of the analog to digital converter is saturated, the current is reduced.

8. The circuit of claim 5 wherein, if the output of the analog to digital converter is below the threshold value, the current is increased.

\* \* \* \* \*